United States Patent [19]
Nelson et al.

[11] 3,763,765
[45] Oct. 9, 1973

[54] APPARATUS AND METHOD FOR MAKING FILLED FOOD ITEM

[76] Inventors: Richard L. Nelson, 669 Riverside Dr.; Walter P. Nelson, 154 Fuller Rd., both of Battle Creek, Mich. 49015

[22] Filed: Apr. 16, 1971

[21] Appl. No.: 134,731

Related U.S. Application Data

[63] Continuation-in-part of Ser. No. 73,807, Sept. 21, 1970, Pat. No. 3,666,485, which is a continuation of Ser. No. 793,220, Jan. 10, 1969, Pat. No. 3,538,840, which is a continuation of Ser. No. 650,137, June 29, 1967, abandoned, which is a continuation of Ser. No. 356,874, April 2, 1964, abandoned.

[52] U.S. Cl. ............... 99/450.7, 141/165, 141/173, 141/176, 141/242, 141/263, 141/324, 221/298, 222/318, 269/254 R
[51] Int. Cl. ..... A21c 9/06, B65b 43/46, B65b 43/56
[58] Field of Search ........................ 99/450.6, 450.7, 99/450.8, 537, 547; 221/298; 269/254 R; 222/318; 141/67, 98, 165, 173, 176, 191, 242, 263, 324, 374, 392

[56] References Cited
UNITED STATES PATENTS
1,643,260   9/1927   Siegert ........................... 99/450.8
2,916,125   12/1959  Wallberg .......................... 221/298
3,182,611   5/1965   Ruberstein ....................... 99/450.4
3,474,932   10/1969  Rogge ............................ 221/298 X
2,567,590   9/1951   Ashlock, Jr. .................... 99/450.7 UX Primary Examiner—Harvey C. Hornsby
Assistant Examiner—Alan I. Cantor
Attorney—Roy A. Plant and Samuel Kurlandsky

[57] ABSTRACT

A filled edible product is described, as for example a bread stick, a shorter like item in the form of a pretzel stick, or products of other shapes such as balls or irregular shapes, any of which are at least initially brittle, unyielding, and incompressible. The product is filled by first inserting it in a holding means which contains a resilient product support member for resiliently gripping and supporting the stick, after which an elongated cavity is formed in the product from one end and the cavity subsequently filled with an extrudible material such as cheese, whipped cream, peanut butter, custard, fruit preserves, and jelly. The invention also includes an improved continuously operating, rotatively indexed apparatus for drilling while properly supporting the product and subsequently filling the cavity formed with the extrudible material.

11 Claims, 9 Drawing Figures

PATENTED OCT 9 1973

INVENTORS
R.L. NELSON AND
W.P. NELSON

BY *Plant & Kurlandsky*

ATTORNEYS

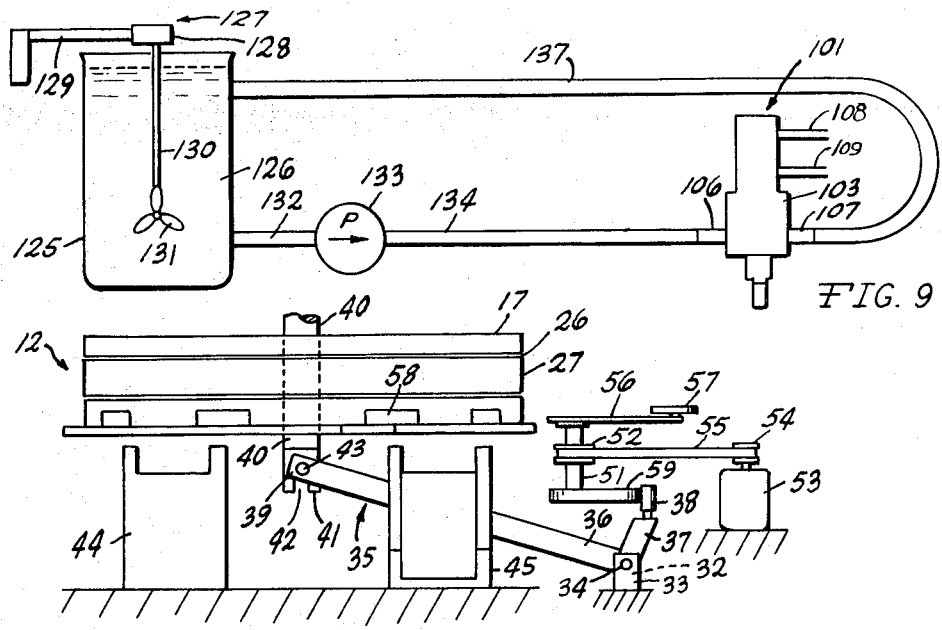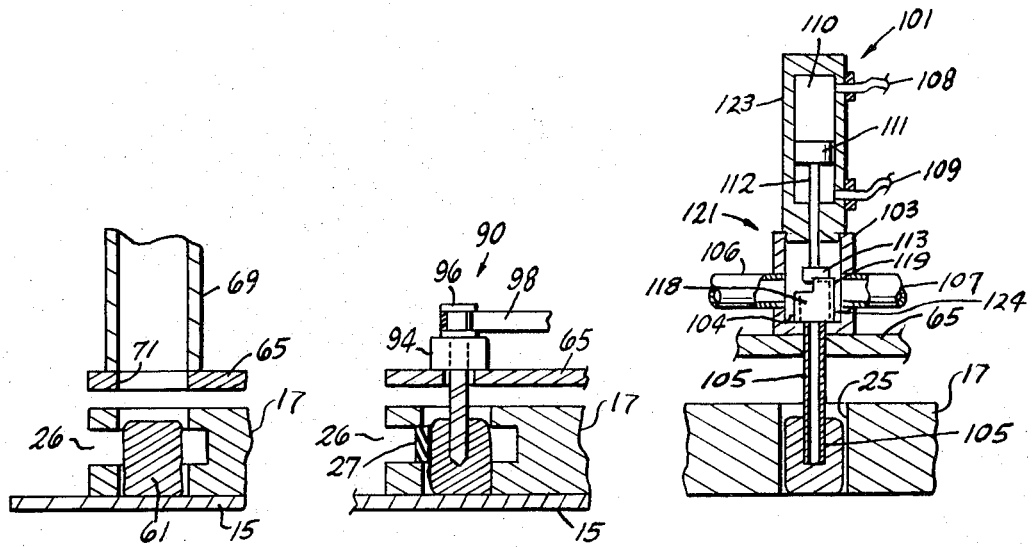

APPARATUS AND METHOD FOR MAKING FILLED FOOD ITEM

BACKGROUND OF THE INVENTION

This application is a continuation-in-part of our pending application Ser. No. 73,807, filed Sept. 21, 1970, and issued May 30, 1972 as U. S. Pat. No. 3,666,485, which in turn is a continuation of our application Ser. No. 793,220, filed Jan. 10, 1969, issued Nov. 10, 1970 as U. S. Pat. No. 3,538,840, which in turn is a continuation of our application Ser. No. 650,137, filed June 29, 1967, which in turn was a continuation of our application Ser. No. 356,874, filed Apr. 2, 1964, the latter two both now abandoned.

The present invention relates broadly to the field of article filling, and in its specific phases to a filled bread stick, pretzel stick, ball-shaped, or irregularly-shaped products, and the method and apparatus for making same.

It is well-known practice to pierce a food item having a soft, relatively open and porous interior, such as a cream puff or doughnut of pillow shape, with a needle-like piercing member and directly inject into such food item through the piercing member, a thick but flowable filling such as whipped cream, custard, fruit preserves, and jelly. The filling of hollow ice cream cone type items by various filling procedures, such as with soft ice cream like material flowing from a faucet has also been proposed. Such procedures do not lend themselves to the filling of relatively solid items, and especially the solid and relatively irregular, brittle, stick-like, hard crust items, and it was a recognition of the marketing possibilities of such items and a special method and apparatus for producing them, not commercially available, which led to the conception and development of the present invention.

SUMMARY OF THE INVENTION

Accordingly, among the objects of the present invention is the provision of a product in the form of an initially solid, brittle, hard crust-covered product, as for example a bread stick or pretzel stick, which has been mechanically hollowed and filled with a suitable filler, and the method and apparatus for producing such product.

Another object of the present invention is to provide a new method of handling and filling a manufactured item which is of initially solid, relatively irregular and brittle, stick-like form.

Another object of the present invention is to provide a new method of handling and filling a manufactured initially solid, relatively irregular and brittle item, such as a bread stick or pretzel stick, wherein the sides of same are resiliently supported with mild holding pressure while the item is being mechanically hollowed ready to receive a suitable filling.

Another object of this invention is to provide an improved apparatus which will receive an intially solid, relatively irregular and brittle item, process, fill and deliver same ready for use or packaging.

Another object of this invention is to provide an apparatus which will receive a manufactured, initially solid, relatively irregular and brittle item, such as a bread stick or pretzel stick, and resiliently support its sides and hold same with mild pressure while it is being hollowed and filled, before it is delivered ready for use, cutting, and/or packaging.

Another object of this invention is to provide an apparatus which will receive a bread stick, pretzel stick, ball-shaped, or irregularly-shaped product, drill it substantially from one end almost to the other, fill same from the inside of said drilled opening, starting adjacent the bottom of same, with a suitable thick but extrudable filling material, and deliver same for further processing, using, or packaging.

A further object of this invention is to provide an apparatus having a series of receptacle openings for receiving and having resiliently held therein, food items, such as bread sticks or pretzel sticks, and which will automatically process and deliver them as filled bread sticks or pretzel sticks.

Still another object is to provide an apparatus which is extremely compact and uncomplicated, and which is adapted for receiving and resiliently holding relatively irregular and brittle, solid members, such as bread sticks or pretzel sticks, and which while so held will automatically drill said solid members and fill them with a carefully metered volume of a suitable viscous filler and then discharge same.

It is still another object to provide a novel pump assembly adapted to receive and discharge a continuously flowing viscous material, and upon a properly applied actuation impulse, to inject a carefully metered amount of the material into a cavity prepared in a food item.

Still further objects and advantages of this invention will appear as the description proceeds.

To the accomplishment of the foregoing and related ends, the invention, then, consists of the products, methods and means hereinafter fully described and particularly pointed out in the claims, the annexed drawings and the following description setting forth in detail certain products, means and modes of carrying out the invention, such disclosed products and the means and modes for making same illustrating, however, but one of the various ways in which the principle of the invention may be used.

BRIEF DESCRIPTION OF THE DRAWINGS

In the annexed drawings:

FIG. 5 is a fragmentary side elevational view taken along the line V—V of FIG. 1, looking in the direction of the arrows.

FIG. 6 is a fragmentary sectional view taken along the line VI—VI of FIG. 3, looking in the direction of the arrows.

FIG. 7 is a fragmentary sectional view taken along the line VII—VII of FIG. 2, looking in the direction of the arrows.

FIG. 8 is a fragmentary cross-sectional view taken along the line VIII—VIII of FIG. 2, looking in the direction of the arrows; and FIG. 9 is a diagrammatic representation of the portion of the apparatus utilized for supplying and inserting viscous filling material into the food products.

DESCRIPTION OF THE SPECIFIC EMBODIMENTS

Figure 1:
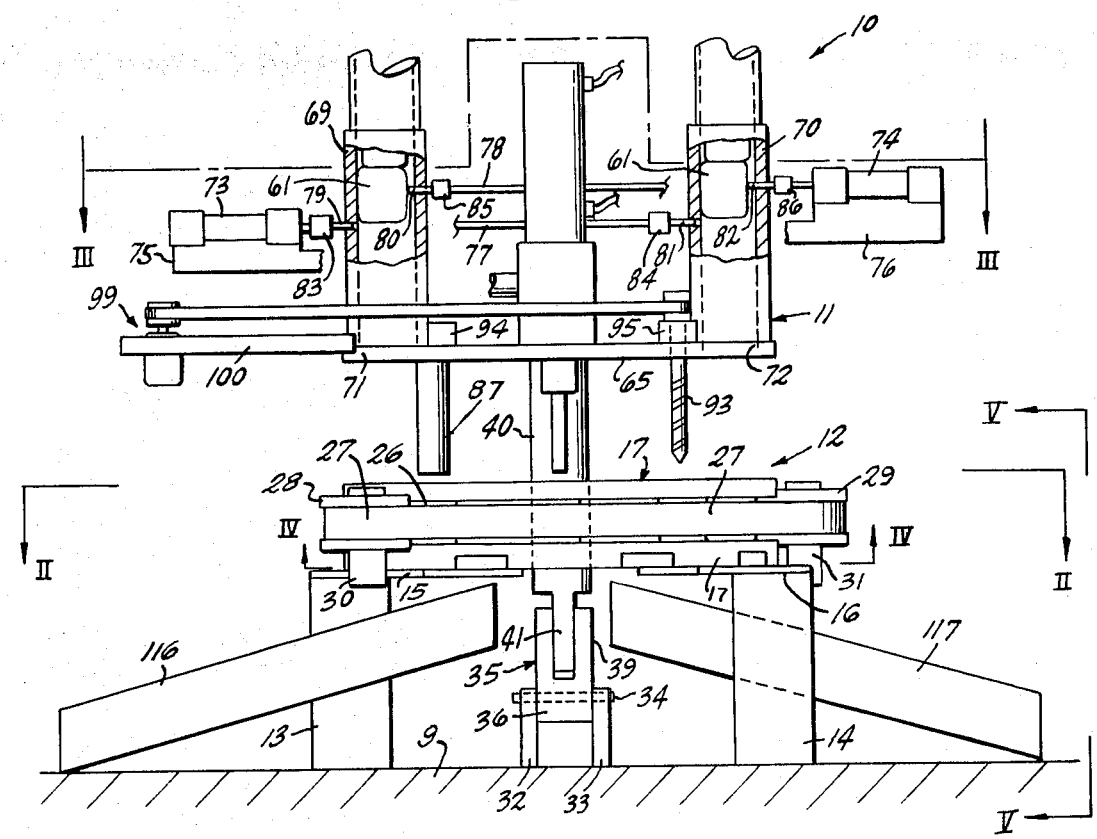
FIG. 1 is a side elevational view partly in cross-section of a preferred form of the apparatus according to the invention.
Figure 2:
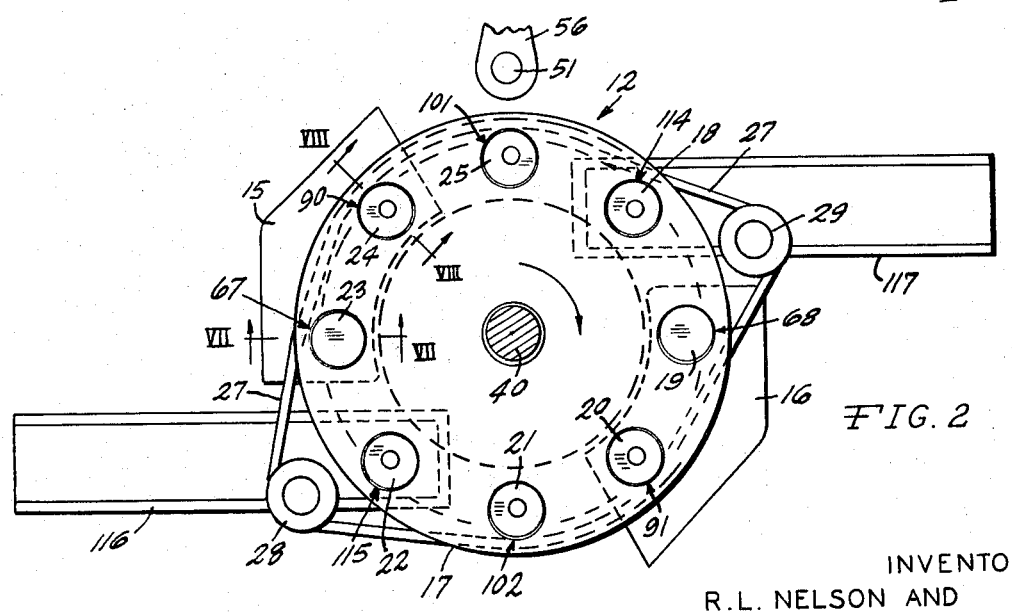
FIG. 2 is a view taken along line II—II of FIG. 1, looking in the direction of the arrows.

Referring to FIGS. 1 and 2, the operational portion of the present apparatus 10 is shown generally and comprises a vertically reciprocating processing head 11 and an indexing transport assembly 12. The transport assembly 12 comprises support pedestals 13 and 14 mounted on a base 9, having horizontal support plates 15 and 16, respectively, affixed thereto. An index plate 17 is rotatably mounted about a shaft 40, and is provided with a plurality of receptacle openings 18, 19, 20, 21, 22, 23, 24 and 25. The index plate 17 is also provided with a peripheral groove 26 communicating with the receptacle openings 18–25. A pair of idler pulleys 28 and 29 are mounted on pulley supports 30 and 31, FIG. 1, coplanar with the peripheral groove 26 of the index plate 17. A resilient endless belt 27 of rubber or other resilient material engages the pulleys 28 and 29 and the groove 26 of the plate 17, for purposes to be explained below.

As shown in detail in FIGS. 1 and 5, the rod 40 about which the index plate 17 is rotatable is axially movable in order to raise and lower the processing head 11. Means for moving the rod 40 is provided by a lever assembly 35, FIGS. 5, having a major lever arm 36 and an offset arm 37 having a cam follower roller 38 at the end thereof. Lever support posts 32 and 33 mounted on the base 9 are provided with a pin 34 journaled through one end of the lever arm 36. The lever arm 36 is provided with a forked end 39 at its other extremity. The drive rod 40 is provided with a constricted end 41 having a slot 42 engaging and freely fitting a pivot pin 43 affixed at the forked end of the lever arm 36.

As shown in FIG. 5, the structure for rotating the index plate assembly 17 successively to each of a sequence of fixed positions or stations is a modified Geneva movement comprising a shaft 51 rotatably mounted, and having a pulley 52 affixed thereto. Motor means 53 has a pulley 54 affixed to the end of its shaft operatively coupled to the pulley 52 by means of an endless belt 55. A crank arm 56 is affixed at one end to the shaft 51 and has a roller disc 57 rotatably mounted at the other end. At the lower end of the shaft 51 is a cam disc 59, the periphery of which engages and is followed by the cam roller 38. The lower surface of the index plate 17 is provided with U-shaped open slots 58 which are engaged by the disc 57 of the arm 56 causing the index plate 17 to rotate a predetermined amount with each rotation of the arm 56 and causing each receptacle opening to move from one station to a successive station with each arm rotation.

Figure 3:
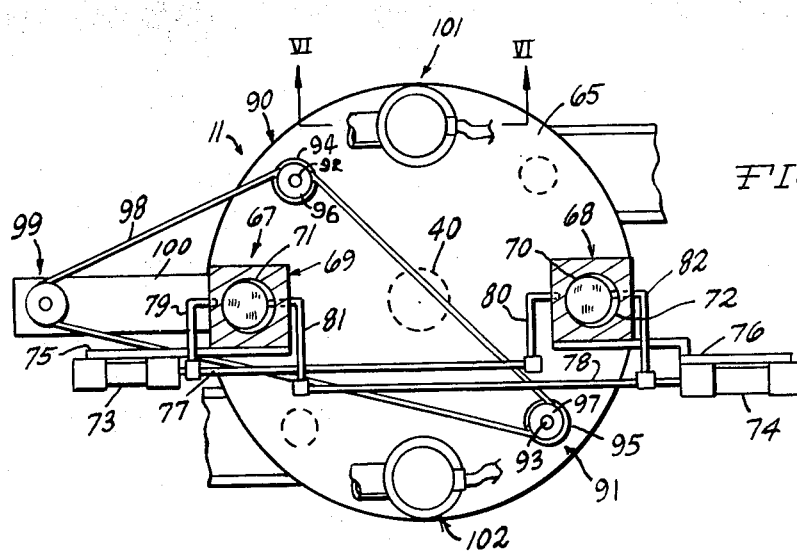
FIG. 3 is a view partly in cross-section taken along line III—III of FIG. 1, looking in the direction of the arrows.
Figure 4:
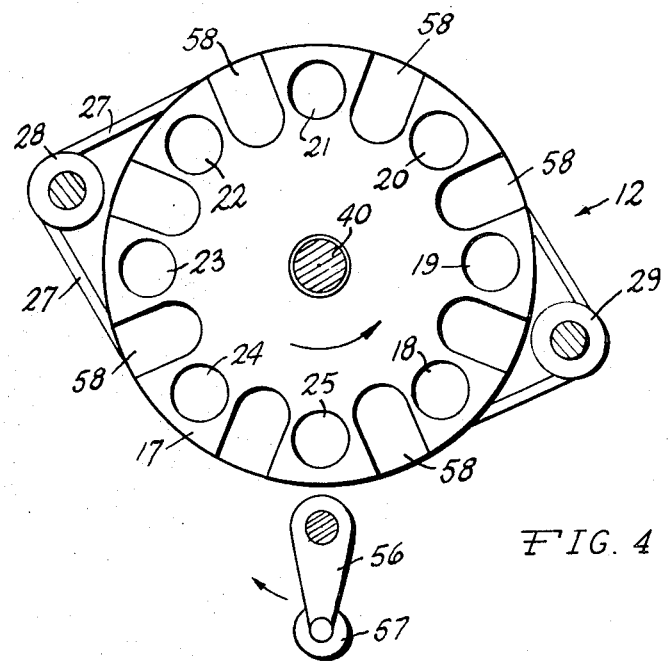
FIG. 4 is a fragmentary view partly in cross-section taken at the line IV—IV of FIG. 1, looking in the direction of the arrows.

Referring to FIGS. 1 and 3, the structure of the operating head 11 is shown in detail and comprises a base plate 65 affixed to the end of the shaft 40. The base plate is provided with loading stations 67 and 68, FIG. 3, comprising loading tubes 69 and 70 affixed to the plate at plate orifices 71 and 72, respectively. A pair of air operated cylinders 73 and 74 mounted on supports 75 and 76, respectively, are provided with thrust rods 77 and 78 having engaging fingers 79, 80, 81 and 82, respectively, affixed to the rods 77 and 78 by means of clamps 83, 84, 85 and 86.

A pair of drilling stations 90 and 91, FIG. 3, is defined in the position of the receptacles 24 and 20, FIG. 2, having drills 92 and 93 journaled in bearings 94 and 95 and having pulleys 96 and 97 affixed at their ends. The drills 92 and 93 are driven by means of a motor and pulley combination 99 mounted on a support 100. An endless belt 98 mounted over the pulleys 96, 97 and 99 causes the drills 92 and 93 to rotate.

As shown in FIGS. 1, 2 and 3, a pair of filling stations 101 and 102 is provided at the positions shown by the receptacles 25 and 21. A filling station 101, identical with the structure of station 102, is shown in detail in FIG. 6 and comprises a metering pump 121 having a cylinder block 103 mounted on the plate 65 and having a pump cylinder chamber 104 provided therein. A filling material inlet 106 and filling material outlet 107 are mounted on the sides of the block 103. An air operated pumping cylinder 123 is mounted at the top of the cylinder block 103 and is provided with air inlets and outlets 108 and 109 communicating with a cylinder chamber 110 defined within the cylinder 123. An operating piston 111 is mounted in the chamber 110 and is provided with a rod 112 which operates a pumping piston 113 positioned in its rest position near the mouth of a metering bore 118 of a metering cylinder 124. One side of the metering cylinder is cut away over about half its perimeter to form a deflector 119 at the lip of the metering bore 118 and extending around the perimeter of the bore, as for example about half-way. In its uppermost position the pumping piston 113 is at or slightly below the upper lip of the deflector 119. In this position it cooperates with the deflector to form a scoop directing the filling material into the metering bore cavity. The metering cylinder 124 and the pumping piston 113 have a diameter substantially smaller than the diameter of the cylinder chamber 104. Consequently, the filling material which enters the inlet 106 is free to pass around the pumping piston 113 and metering cylinder 124 and to exit from the outlet 107 as it circulates. The structure described permits the filling material to be continuously circulated through the metering pump in order to prevent settling of the solid material thereof, while still drawing off as much filling material as required in the metering bore chamber to fill the cavities of the food products. The amount of filling material metered and ejected by each stroke of the piston 102 may be adjusted by adjusting the downwardmost limiting position of the piston 113.

Discharge stations 114 and 115 are provided in the positions of receptacles 18 and 22 of FIG. 2, and are provided with inclined chutes 116 and 117 for catching and transporting the completely processed bread sticks or pretzel sticks and transporting them to a container. Knock-out studs 87 assist in removing the sticks from the receptacles.

Referring to FIG. 9, the portion of the apparatus used for supplying filling material to the filling apparatus is shown and comprises a container 125 having filling material 126. A stirrer 127 is mounted over the container 125 and comprises an electric motor 128, a mounting bracket 129, and a stirring rod 130 having a propeller means 131 at its end. The container 125 is connected by means of tubing 132, as for example flexible plastic tubing, to a pump 133. The pump 133 is connected by means of tubing 134 to the inlet 106 of the filling station 101. The outlet 107 is connected by means of tubing 137 to the container 125.

In order to supply the filling station 101 with filling material 126, the stirrer 127 is placed in operation to maintain the filling material at a uniform consistency. The pump 133 is then placed in operation, thereby pumping filling material to the chamber 104, FIG. 6, of the filling block 103. The material should be supplied at a rate at least equal to that at which the filling station utilizes the material to fill the cavities of the food products. Optimum operation results when the filling material is supplied at a rate greater than that at which it is utilized, the excess circulating through the chamber 104, into the outlet 107, and returning to the container 125 by means of the tubing 137. Such operation aids in maintaining the filling material at the proper consistency and prevents solids from settling out within the tubing or chamber. The apparatus also insures that a uniform amount of filling material is metered out and supplied to the food product in each operation cycle. To place the present apparatus in operation, a plurality of bread sticks or pretzel sticks are loaded into a hopper (not shown) and transported through suitable means, as for example a plastic tube connected to the loading tubes 69 and 70, FIGS. 1 and 3. The filling material, as for example bleu cheese, cheddar cheese, peanut butter, et cetera, is placed in a suitable tank or reservoir 125, FIG. 9, having a stirrer to maintain the material in mixed condition. When power is applied, the pump 133 circulates the filling material to the filling stations 101, FIG. 6, pumping material through the inlet 106, into the cylinder bore cavity 104 and out again through the outlet 107, the filling material then being recirculated back to the tank or reservoir 125 to keep the material continually stirred.

Power is also applied to cause the drills 92 and 93, FIG. 3, to rotate. Additionally, an air compressor is caused to operate, thereby pumping compressed air, FIG. 6, to the cylinder inlets and outlets 108 and 109 through control valves. Compressed air is also applied through control valves to the air operated cylinders 73 and 74, FIG. 3, which control the loading tubes 69 and 70. The power train also causes the crank arm 56, FIG. 5, to rotate about its end opposite disc 57, thereby rotating the index plate 17 so that with each complete rotation each receptacle 18-25 is caused to advance to the next station. Additionally, rotation of the shaft 51 causes the cam disc 59 to rotate and to act on the cam follower roller 38, thereby causing the rod 40 to engage in vertical reciprocal motion, causing the operating head 11 to rise and fall. The actuation of the air operated cylinders 73, 74 and 107 may be controlled in conventional manner by cam operated switches (not shown) associated with the main power train.

The process utilizing the present apparatus begins with air impulses applied to the air operated cylinders 73 and 74, FIG. 3, causing the fingers 79–82 to release a single bread stick 61, FIG. 1, in each of the tubes 69 and 70. The bread sticks 61 fall through the plate orifices 71 and 72, FIGS. 1 and 7, and into the receptacle openings 23 and 19, FIG. 2. The break sticks thus delivered are supported vertically by the support plates 15 and 16, respectively. The next rotation of the Geneva movement advances the index plate so that the bread sticks are now advanced to the drilling stations 90 and 91. While the bread sticks 61 are at the drilling stations 90 and 91, the operating head 11 is lowered, causing the drills 92 and 93 to drill holes into the bread sticks, after which the head is again raised. While in the drilling stations, the bread sticks are supported at the bottom by the support plates 15 and 16 and supported laterally by engagement with the flexible belt 27. After the operating head 11 is raised, the Geneva movement causes the index plate to rotate to the next stage, placing the bread sticks at the filling stations 101 and 102. The operating head 11 is again lowered causing the filling nozzles 105, FIG. 6, to enter the axial cavities formed by the drills. The air cylinders 107 are then actuated, causing the pumping pistons 113 to descend into the metering bore 118 and to force a metered amount of the filling material through the nozzle 105 into the cavity formed in the bread stick. The support plates 15 and 16 do not extend below the index plate receptacle openings beyond the drilling stations 90 and 91, and therefore the sole means of support for the bread sticks at the filling stations is engagement with the flexible belt 27. The apparatus is so designed so that in case of misalignment or other defect preventing the nozzle from freely entering the cavity within the bread stick or pretzel stick, the filling apparatus will not be damaged or clogged by striking an outer surface of the bread stick or pretzel stick. When such defect or misalignment results, the nozzle merely forces the bread stick out of engagement with the belt and causes it to be ejected as waste.

After the cavities within the bread sticks or pretzel sticks are filled, the operating head 11 is once more raised and the index plate rotated by the Geneva movement until the filled bread sticks or pretzel sticks reach the unloading stations 114 and 115. Here, because there is no vertical support for the filled item, since the support plates 15 and 16 do not reach these positions, and additionally, because of the arrangement of the pulleys 28 and 29, the holding engagement of the flexible belt 27 with the bread sticks is removed, the filled items fall or are pushed by the lug 87 through the receptacle openings and into the chutes 116 and 117, by which means the completely processed bread sticks or pretzel sticks are conveyed to suitable receiving or packaging receptacles (not shown).

Although the operation of the apparatus has been described with regard to the steps performed on a pair of bread sticks or the like, operation of the entire apparatus, is, of course, continuous with such bread sticks or the like continually being introduced into the loading tubes and continually being discharged at the unloading stations.

The present apparatus utilizing a rotating index plate and processing stations arranged in a circle, with the index plate being rotated successively to the various processing stations by means of a Geneva movement, is exceedingly advantageous. It permits a very compact and versatile piece of equipment which may be utilized in a continuous process. Although the apparatus has been illustrated and described as having two complete sets of processing stations, either one set or more than two sets may be conveniently utilized. Moreover, although the present apparatus has been described having each set of stations serially arranged, the apparatus can, of course, be modified so that the disc encounters first two loading stations, then two drilling stations, two filling stations, and finally two unloading stations. With such an arrangement, the Geneva movement would rotate the index plate two positions each time instead of only one. As a further variant, instead of applying the crank member 56 directly to the index plate, the movement may be applied to a remote portion of the apparatus and transferred to the index plate by means of shaft and gear coupling arrangements, commonly known in the art, and it is intended that the showing be considered to diagrammatically illustrate same. Such an arrangement is especially useful when a plurality of index plates and operating heads are mounted on a single apparatus base, since they can then all be operated by a single Geneva movement.

An especially advantageous feature of the invention resides in the structure of the filling pump. In the apparatus described in the related applications referred to above, a filling pump is disclosed which is filled with a single charge and is utilized to fill a group of bread sticks or pretzel sticks with each charge or unidirectional movement of the pump, and then starting over for the next group. However, it has been found that the last bread stick or pretzel stick of the group to be filled receives only a partial filling, since it is not possible to load the pump with an exact amount of filling material. Utilizing the presently disclosed filling arrangement, a secondary pump continually circulates the filling material so that it maintains its consistency. Circulation continually takes place through the pump by means of the inlet 106 and outlet 107. When the pumping piston 113 descends, it always engages and expels the same amount of filling material. The process is consequently continuous and avoids partial fills at any time so long as a full supply from the main supply is delivered by inlet 106 to the pump chamber 104.

Other modes of applying the principle of our invention may be employed instead of those explained, change being made as regards the means and the methods herein disclosed, provided those stated by any of the following claims or their equivalent be employed.

We therefore particularly point out and distinctly claim as our invention:

1. An apparatus for producing a completely edible, filled food item from a manufactured, initially brittle, substantially unyielding and incompressible preformed body portion having a filling material therein, comprising:
   a. a transport member comprising:
      1. a rotatably mounted index plate member for rotation about a substantially vertical axis, a plurality of receptacle openings provided in said plate arranged in a circle having its center substantially coincident with said axis of rotation,
      2. means for engaging and supporting said body portion,
      3. means defining an unloading station for removing processed food items from said receptacle openings, and
      4. means for intermittently rotating said index plate member to a plurality of predetermined positions;
   b. an operating member comprising:
      1. a loading station having loading means for introducing individual body portions into said receptacle openings,
      2. a drilling station drilling means adapted to form an axial channel in said body portions,
      3. a filling station having means for filling said axial channels with a fluid food material, said loading means, said drilling means, and said filling means being arranged substantially at the periphery of a circle having substantially the same radius as and being coaxially superposed over the circle around which said receptacle openings are arranged, said means for rotating said index plate being so arranged that each predetermined position of said index plate places receptacle openings in positions coaxial with said loading station, said drilling station, said filling station and said unloading station; and
   c. means for reciprocating said transport member and said operating member axially with respect to each other, wherein said circular index plate is removed with a peripheral groove communicating with said receptacle openings, a flexible endless belt engaged within said groove, and means arranged to cause said belt to engage and support said body portions at said drilling station and said filling station, and to disengage said food items at said loading station and said unloading station.

2. An apparatus according to claim 1, having a stationary plate mounted below said index plate at said loading station and said drilling station for supporting said body portions vertically at those stations.

3. An apparatus according to claim 1, wherein said operating member and said transport member both are provided with a plurality of loading stations, drilling stations, filling stations, and unloading stations arranged in said circle.

4. An apparatus according to claim 1, wherein a discharge chute is provided having its upper end positioned below said discharge station.

5. An apparatus according to claim 1, having means for controlling and releasing only one body portion at a time into a receptacle opening at said loading station.

6. An apparatus for producing a completely edible, filled food item from a manufactured, initially brittle, substantially unyielding and incompressible performed body portion having a filling material therein, comprising:
   a. a transport member comprising:
      1. a rotatably mounted index plate member for rotation about a substantially vertical axis, a plurality of receptacle openings provided in said plate arranged in a circle having its center substantially coincident with said axis of rotation,
      2. means for engaging and supporting said body portion,
      3. means defining an unloading station for removing processed food items from said receptacle openings, and
      4. means for intermittently rotating said index plate member to a plurality of predetermined positions;
   b. an operating member comprising:
      1. a loading station having loading means for introducing individual body portions into said receptacle openings,
      2. a drilling station drilling means adapted to form an axial channel in said body portions,
      3. a filling station having means for filling said axial channels with a fluid food material, said loading means, said drilling means, and said filling means being arranged substantially at the periphery of a circle having substantially the same radius as and being coaxially superposed over the circle around which said receptacle openings are arranged, said means for rotating said index plate being so arranged that each predetermined position of said index plate places receptacle openings in positions coaxial with said loading station, said drilling station, said filling station and said unloading station; and c. means for reciprocating said transport member and said operating member axially with respect to each other, wherein said filling means comprises a metering pump having a housing with a chamber provided therein, means mounted within said housing chamber and spaced apart from the vertical walls thereof having a cylinder bore provided therein, a piston arranged for reciprocal movement having a lower limiting position wherein said piston is positioned within said cylinder bore and an upper limiting position wherein said piston is positioned outside said cylinder bore to permit said filling material to enter into said cylinder bore, means for reciprocably moving said piston, a nozzle at the lower end of said housing communicating with said cylinder bore and arranged to transmit said filler material to the axial channel provided in said body portions, and inlets and outlets at the side of said housing for circulating said filler material to and from said housing chamber.

7. An apparatus according to claim 6, wherein said outlet communicates with said housing chamber and is positioned opposite and approximately at the same level as said inlet.

8. An apparatus according to claim 6, wherein said means having a cylindrical bore is a cylinder having a portion of the upper wall thereof removed to define a deflector cooperating with said piston when in its upper limiting position to define a scoop serving to facilitate the introduction of said filling material into said cylinder bore.

9. A metering pump adapted to be supplied by a continuously circulating liquid material and upon actuation to supply individual charges having a predetermined volume of said liquid material, said pump having a housing with a chamber provided therein, means mounted within said housing chamber and spaced apart from the vertical walls thereof and having a cylinder bore provided therein, a piston arranged for reciprocal movement having a lower limiting position wherein said piston is positioned within said cylinder bore and an upper limiting position wherein said piston is outside said cylinder bore thereby permitting said liquid material to enter into said cylinder bore, means for reciprocably moving said piston, a nozzle at the lower end of said housing communicating with said cylinder bore and arranged to transmit said liquid material to the cavity of an article to be filled, and inlets and outlets at the side of said housing for circulating said liquid material to and from said housing chamber.

10. A pump according to claim 9, wherein said means having a cylindrical bore is a cylinder.

11. A pump according to claim 10, wherein a portion of the open end of said cylinder is removed to define a deflector extending substantially half-way around the periphery of said cylinder and cooperating with said piston when in its upper limiting position to define a scoop facilitating the introduction of said liquid material into said cylinder bore.

* * * * *

PO-1050
(5/69)

UNITED STATES PATENT OFFICE
CERTIFICATE OF CORRECTION

Patent No. 3,763,765          Dated October 9, 1973

Inventor(s) Richard L. Nelson and Walter P. Nelson

It is certified that error appears in the above-identified patent and that said Letters Patent are hereby corrected as shown below:

Column 3, line 28, for "FIGS." read -- FIG. -- .
Column 8, lines 9-10 for "removed" read -- provided -- ;
         line 34, for "performed" read -- preformed -- .

Signed and sealed this 5th day of March 1974.

(SEAL)
Attest:

EDWARD M. FLETCHER, JR.      C. MARSHALL DANN
Attesting Officer              Commissioner of Patents